(12) United States Patent
Boebel

(10) Patent No.: US 7,452,251 B2
(45) Date of Patent: Nov. 18, 2008

(54) INTEGRATED OUTBOARD MOTOR

(75) Inventor: Friedrich Boebel, Eurasburg (DE)

(73) Assignee: Torqeedo GmbH, Starnber (DE)

( * ) Notice: Subject to any disclaimer, the term of this patent is extended or adjusted under 35 U.S.C. 154(b) by 0 days.

(21) Appl. No.: 11/619,231

(22) Filed: Jan. 3, 2007

(65) Prior Publication Data

US 2007/0173140 A1 Jul. 26, 2007

(30) Foreign Application Priority Data

Jan. 20, 2006 (DE) ............... 10 2006 003 027
Mar. 31, 2006 (EP) .................. 06006818

(51) Int. Cl.
*B63H 21/17* (2006.01)
(52) U.S. Cl. ............................. 440/6; 440/76
(58) Field of Classification Search ........... 440/6, 440/66, 76; 318/811
See application file for complete search history.

(56) References Cited

U.S. PATENT DOCUMENTS

| | | | | |
|---|---|---|---|---|
| 3,895,276 A | * | 7/1975 | Brown et al. ......... | 318/811 |
| 4,099,478 A | * | 7/1978 | Alexander, Jr. ....... | 440/6 |
| 4,559,016 A | | 12/1985 | Piber | |
| 5,445,545 A | * | 8/1995 | Draper ............. | 440/6 |
| 6,104,112 A | | 8/2000 | Vanjani | |
| 6,169,345 B1 | | 1/2001 | Bloch et al. | |
| 6,244,912 B1 | * | 6/2001 | Quadrini et al. ...... | 440/6 |
| 6,790,109 B1 | | 9/2004 | Heer et al. | |

FOREIGN PATENT DOCUMENTS

| | | |
|---|---|---|
| DE | 1 100 493 | 2/1961 |
| DE | 36 42 727 A1 | 6/1988 |
| DE | 197 14 784 A1 | 10/1998 |
| DE | 103 01 272 A1 | 8/2004 |
| EP | 1 010 614 A1 | 6/2000 |
| EP | 1 523 087 A1 | 4/2005 |
| WO | WO 00/47464 A1 | 8/2000 |
| WO | WO 2004/112220 A1 | 12/2004 |

OTHER PUBLICATIONS

European Search Report dated Jul. 24, 2006 with English translation of relevant portion (eleven (11) pages).
European Search Report dated May 30, 2007 (Five (5) pages).

* cited by examiner

*Primary Examiner*—Lars A Olson
(74) *Attorney, Agent, or Firm*—Crowell & Moring LLP

(57) ABSTRACT

An outboard drive has an electric motor that is electronically controlled from an inverter. The outboard drive includes a pylon, with the electric motor and inverter arranged in the pylon.

4 Claims, 3 Drawing Sheets

INTEGRATED OUTBOARD MOTOR

BACKGROUND AND SUMMARY OF THE INVENTION

The present invention relates to an outboard drive with an underwater gondola or pylon which comprises a carrier body wherein the carrier body is provided with an opening through which a shaft runs, wherein the shaft is connected with an electric motor arranged in the underwater gondola, wherein the electric motor is electronically controlled by an inverter.

It is already known to accommodate the electric motor of an electric outboard motor in the underwater gondola of the outboard drive. In the following, underwater gondola or pylon shall mean the underwater part located at the bottom on the shaft of an outboard drive. More preferably the asynchronous motors frequently employed as boat drive in the past are relatively insensitive to moisture so that the motor is not immediately destroyed should water enter the underwater gondola.

Electronically commutated permanent magnet excited synchronous motors are particularly suited for driving boat propellers because of their high torque. In such motors, high magnetic field densities of approximately 1 T/cm$^2$ are generated. Synchronous motors are also partly provided in the underwater gondola.

The alternating field necessary for operating a synchronous motor is controlled by way of an electronic circuit, in the following called inverter. The inverter of an electronically commutated permanent magnet excited synchronous motor to date is not arranged in the underwater gondola since, because of the confined space conditions and the immediate proximity of electric motor and inverter brought about as a result thereof, it was feared that the high magnetic field densities would destroy the control electronics of the inverter.

In addition, the electronics of the inverter are sensitive to water and would be quickly destroyed should water enter the underwater gondola. As protection against moisture and water the inverter is frequently cast in synthetic resin and in this way encapsulated against the effects of outside influences. Cast-in inverters however cannot be accommodated in the underwater gondola since the space available is insufficient for this purpose in most instances.

An object of the present invention is to improve an outboard drive of the kind mentioned at the outset.

This problem is solved through an outboard drive with an underwater gondola wherein the underwater gondola comprises a highly heat conducting carrier body, provided with an opening through which a shaft runs. The shaft is connected with an electric motor arranged in the underwater gondola, and the electric motor is electronically controlled from an inverter. The electric motor is an external rotor motor and the inverter is in thermal contact with the carrier body.

The connection lines between the inverter and the electric motor act as aerials. High currents of sometimes more than 80 A flow especially in high performance motors. If these currents are quickly switched by the inverter, high steep-edged currents must be transmitted via the connection lines between the inverter and the electric motor which cause electromagnetic interferences.

According to the invention, the electric motor and the inverter are now accommodated in the underwater gondola, i.e. in the pylon of the outboard drive. In this way the connection lines between these are kept very short. The electromagnetic interferences, which otherwise are caused with such high steep-edged currents, are avoided as a consequence.

According to the invention the electric motor is of an external rotor design. This means that the stator is arranged in the center and the rotor rotates externally around the stator. The rotation axis of the rotor is located in the center of the stator and coincides with the symmetry of the stator. The poles of the rotor are therefore further away from the rotation of the rotor than the stator poles. The rotor can be ring or bell-shaped.

The magnetic field generated between the poles of the stator and the poles of the rotor are largely directed radially outward relative to the rotor rotation axis of rotation of the rotor. The electromagnetic force is generated in the gap between the internally positioned stator poles and the rotor poles externally located on the ring or bell-shaped rotor, i.e. far away from the axis rotor rotation so that very high torque values are achieved.

In contrast with an internal rotor motor where the rotor rotates inside the stator, the external rotor motor thus has the advantage that, because of the greater distance of the permanent magnets of the rotor from the rotation axis with identical force exerted on the rotor by the rotating field of the stator, a higher torque is generated.

The external rotor motor according to the invention is located in the underwater gondola. The magnetic field generated in the electric motor is, as explained above, directed radially outward. The outer walls or the housing of the underwater gondola can therefore not be manufactured of metal since eddy currents would otherwise be caused in the outer walls. For this reason, the housing of the underwater gondola is mostly made of plastic in the case of external rotor motors. However, plastic possesses a relatively low thermal conductivity as a result of which the heat dissipation by way of the outer walls of the underwater gondola becomes poor.

According to the invention a high heat conductance carrier body is therefore provided which is provided with an opening for the drive shaft of the electric motor. The opening can, for instance, be in the form of a bore, a cut or an indentation in the carrier body. Carrier body and electric motor are arranged offset relative to each other in the axial direction, i.e. in the longitudinal direction of the drive shaft. The magnetic field generated in the electric motor is, however, directed radially. This means that the carrier body is largely located outside the magnetic field so that no eddy currents can be caused in the carrier body.

The carrier body consists of a high heat conductance material, especially of metal. The inverter is arranged so that it is in good thermal contact with the carrier body. Good thermal contact means that the heat loss created during the operation of the inverter is largely passed on to the carrier body and, via this body, effectively passed on to the water surrounding the underwater gondola, so that there is no danger of overheating the electric motor. For this reason, no separate air-cooling for instance using a fan is necessary. Moreover, the inverter with the arrangement according to the invention is located outside the magnetic field as a result of which electromagnetic interferences of the inverter are excluded.

The short connection lines according to the invention allow their inductance and their internal resistance to be additionally minimized. This further contributes to minimizing the electric losses.

The arrangement of electric motor and inverter in the underwater gondola according to the invention is an advantage more preferably with electric motors, above all electronically commutated synchronous motors where high currents flow more preferably if currents of more than 20 A, preferably more than 50 A, but very preferably more than 80 A flow. When switching such high currents, electromagnetic interferences can be caused in the connection lines which are avoided through the short line distances according to the invention.

Outer shape and size of the underwater gondola are designed according to aspects of fluid engineering. Electric motor and inverter must therefore be designed so that they fit in the given form of the underwater gondola and are preferably easy to install. This is achieved through the carrier body according to the invention which is provided with a bore or opening through which the shaft carrying a propeller is inserted. The electric motor is connected to the shaft. The inverter preferably has a central bore and is also fitted onto the shaft. In this way a compact and easily installed unit is obtained.

Preferably the inverter and the electric motor are arranged on the same side of the carrier body. This means that the electric motor and the inverter are fitted on the shaft on the one side of the carrier body, and a transmission can be additionally provided on the other side of the carrier body if required to transform the speed of the electric motor down in the desired way. Through the immediate proximity of electric motor and inverter the electric connections are kept as short as possible.

For manufacturing and service reasons it is particularly favorable if in this case a lid or a housing is placed over the electric motor and the inverter, and connected with the carrier body water tight. The lid in this case forms the, or a part of the, outer form of the underwater gondola. Preferably the lid is screwed on to the carrier body. Through simple screwing on of the lid of the carrier body the electric motor and the inverter are accessible for service and repair purposes.

With regard to the sealing against water, a glued connection between the lid and the carrier body, has also proved itself. By suitable selection of the adhesive, it is also possible to remove the adhesive connection for instance under the influence of heat, if such should be necessary for repair reasons.

On the opposite side of the carrier body the propeller can either be directly fitted on to the shaft or a transmission connected in-between. In the latter case it is an advantage to provide a further lid which is screwed on to the carrier body from the transmission side or otherwise connected to the former. This lid will then have an opening for the shaft.

For design reasons it can also be favourable to arrange the inverter and the electric motor on different sides of the carrier body. With this arrangement it is also an advantage to provide two lids or housings which are connected water tight with the carrier body from both sides, more preferably glued or screwed, and which accommodate the electric motor, the inverter and additional elements if applicable for instance a transmission.

The lids or housing parts which form the outer limits of the underwater gondola are preferably manufactured of plastic. More preferably the lid or the housing part which surrounds the electric motor and is located in the range of influence of the magnetic field consists of electrically non-conductive material. However, it has also proved itself to manufacture other housing parts of the underwater gondola, except for the carrier body, from plastic in order to save weight.

The installation of the underwater gondola consequently presents itself very simply: the drive shaft is initially pushed through the preferably central bore of the carrier body. The inverter and, if necessary or desired, a transmission are fitted onto the shaft on the same side or on the two opposing sides of the carrier body. Next the electric motor is mounted to the shaft. Finally the lid or lids is or are placed over the unit and joined with the carrier body. Thus the underwater gondola or the pylon is mounted and the propeller can be attached to the shaft.

For installation reasons it has additionally proved itself to initially install the inverter on a metal plate and to subsequently bring the metal plate in thermal contact with the carrier body. The inverter with metal plate is easier to handle.

Preferably the electronic switching elements of the inverter, in which the major heat loss is generated, are brought in surface contact with the carrier body. For this purpose, the inverter preferably has a printed circuit board wherein the switching elements are arranged on one side of the printed circuit board. This side of the printed circuit board is directly attached to the carrier body with an intermediate layer of a heat conducting foil.

It is also contemplated to combine the power components which contribute most to the resulting heat loss on a printed circuit board, which is brought into thermally conductive contact with the carrier body. The components serving the control which switch only minor currents can be arranged on a separate printed circuit board which need not necessarily be in thermally conductive contact with the carrier body since hardly any heat loss is generated.

BRIEF DESCRIPTION OF THE DRAWINGS

Other objects, advantages and novel features of the present invention will become apparent from the following detailed description of the invention when considered in conjunction with the accompanying drawings, in which.

DETAILED DESCRIPTION OF THE DRAWINGS

Figure 1:
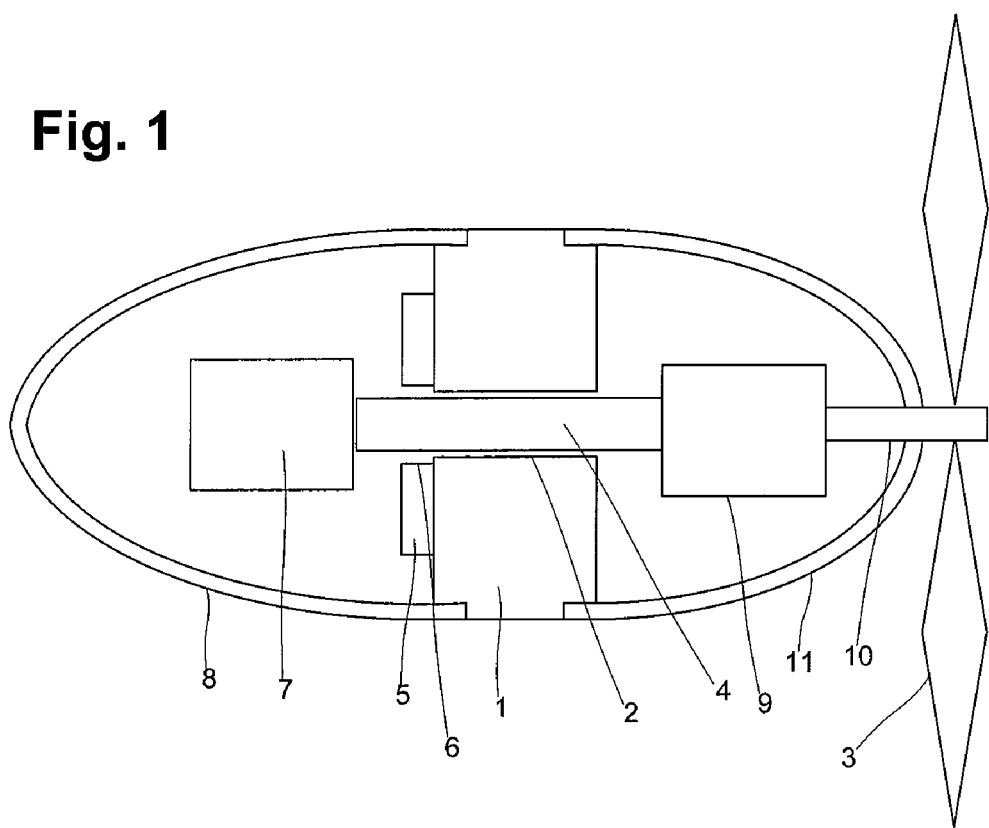
FIG. 1 is a schematic plan view of an arrangement of inverter and electric motor in the pylon according to the invention.

The outboard drive has an underwater gondola or a pylon comprising a carrier body 1. The carrier body 1 is provided with a central bore 2 for passing through of a shaft 4 carrying a propeller 3. An inverter 5 is also provided with a central bore 6 and fitted onto the shaft 4 so that it is arranged adjacent to the carrier body 1. After this, an electric motor 7 designed as synchronous motor is fitted onto the shaft 4 and electrically connected with the inverter 5. A lid 8 is placed over the electric motor 7 and the inverter 5 and connected watertight with the carrier body 1.

On the other side of the carrier body 1 a transmission 9 is connected with the shaft 4. The transmission 9 transmits the speed of the shaft 4 and drives a propeller shaft 10 to which the propeller 3 is attached. The transmission 9 is covered water tight by a lid 11, which has a passage for the shaft 4 sealed against water.

To attach the two lids 8, 11 to the carrier body 1 the carrier body 1 has two threads, on to which the lids 8, 11 are screwed. The outer form of the pylon is thus determined by the lids 8, 11 and the extent of the carrier 1.

Figure 2:
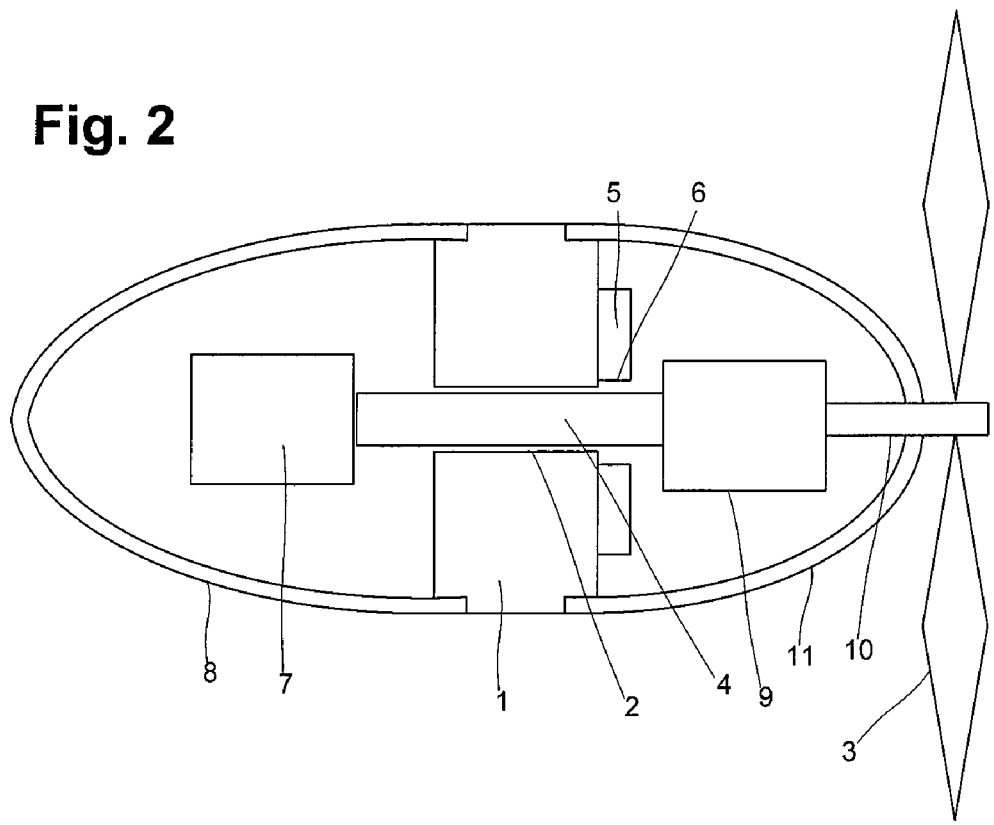
FIG. 2 is a schematic plan view similar to FIG. 1, but of an alternative embodiment of the invention.

FIG. 2 shows an alternative embodiment wherein the inverter 5 and the electric motor 7 are located on opposite sides of the carrier 1. Otherwise the outboard drive is constructed as shown in FIG. 1.

In both embodiments, the inverter and electric motor are integrated in the pylon to keep the electric connection lines between these as short as possible and to achieve preferably effective cooling of the electric motor.

Figure 3:
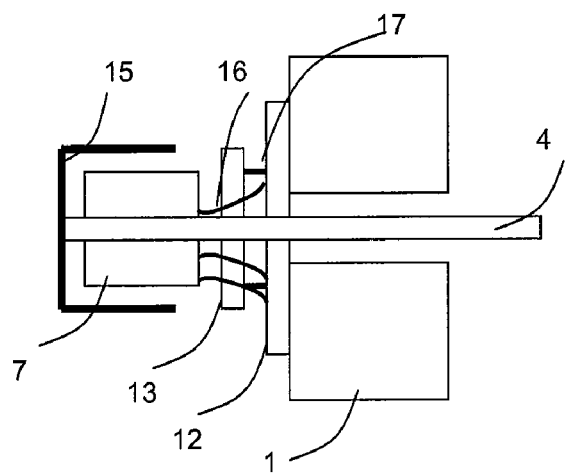
FIG. 3 is a schematic view of a detail of the arrangement shown in FIG. 1.

FIG. 3 shows a detail view of the arrangement of FIG. 1. The inverter 5 has a board 12 with the power components of the electronic inverter circuit and a board 13 with the control unit. The power board 12 carries the control board 13 by way of suitable support elements 17.

The synchronous motor 7 is an external rotor motor and has an externally rotating bell 15 to the inside of which the rotating permanent magnets are attached. The drive shaft 4 which, as described above, extends through the carrier body 1 to the propeller 3, is connected with the bell 15. The synchronous motor 7 is connected to the inverter 5 or the power board 12 by way of extremely short connection lines 16.

Figure 4:
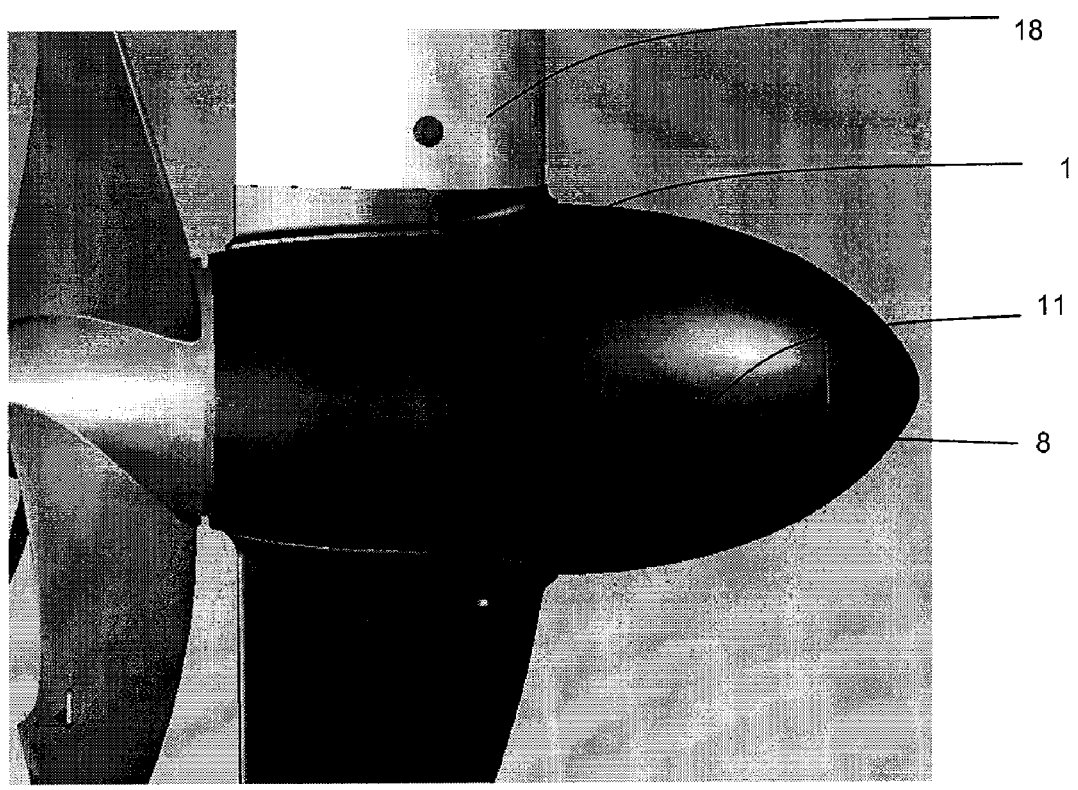
FIG. 4 is an isolated view of another embodiment of the pylon according to the invention.
Figure 5:
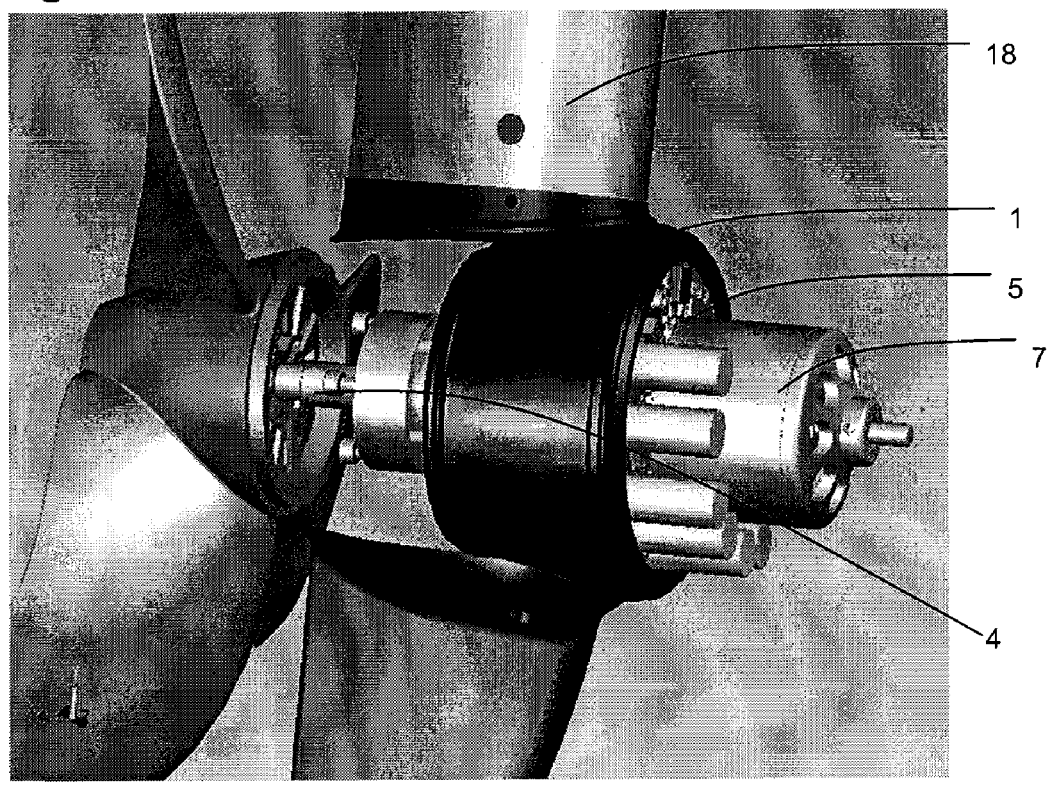
FIG. 5 is a perspective view of the pylon of FIG. 4, but without the lid.
Figure 6:
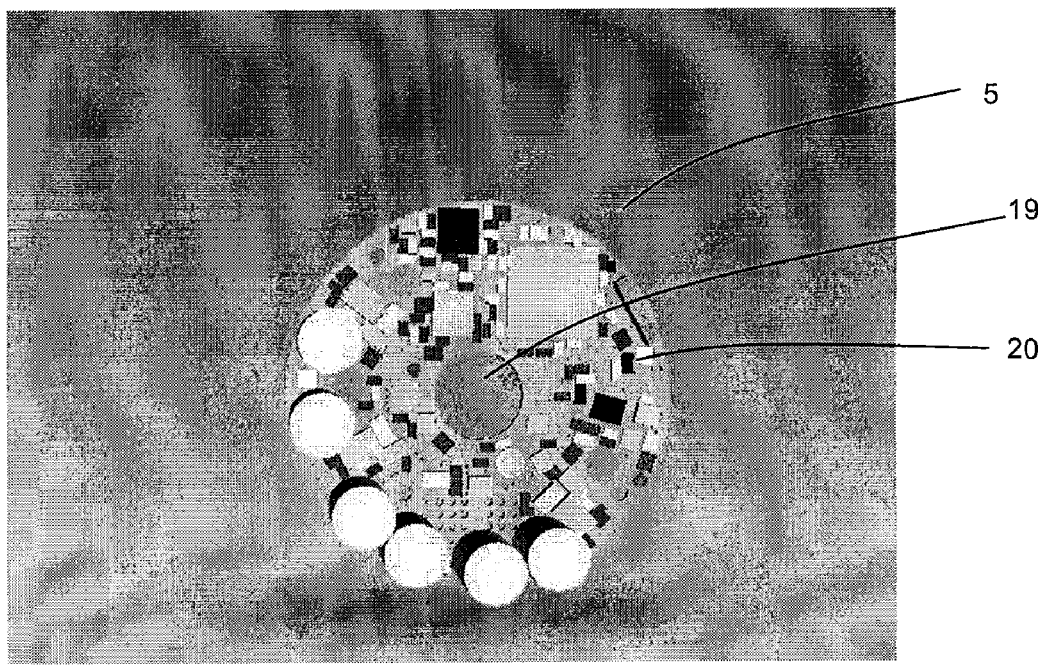
FIG. 6 is a plan view of an inverter employed in the invention.

FIGS. 4 to 6 show a further embodiment of the invention. Identical components in all figures are provided with the same reference numbers.

The underwater gondola 4 is located on the shaft 18 of the outboard drive. The outer envelope of the underwater gondola 8 is formed by the two housing lids 8, 11 and the outside of the carrier body 1.

FIG. 5 shows the same underwater gondola without the two housing lids 8, 11. One can see the central drive shaft 4 which passes through the carrier body 1. The inverter 5 directly adjoins the carrier body 1. The inverter 5 has a central bore 19 for this purpose through which the drive shaft 4 runs. On the back of the printed circuit board 20 of the inverter 5 (not visible in FIG. 6) several electronic switching elements such as power transistors for example are arranged through which a major part of the heat loss created during the operation of the inverter 5 is caused. The inverter 5 is fitted onto the shaft 4 and brought into thermal contact with the carrier body 1. The transistors creating the heat loss are preferably in contact with the surface of the carrier body 1. If required, a heat conducting paste or a heat conducting foil can be provided between the inverter 5 or the electronic components provided on the latter and the carrier body 1.

In FIG. 5 the arrangement of the electric motor 7 in the underwater gondola is also shown. The electric motor 7 is offset in an axial direction relative to the inverter and the carrier body 1. The electric motor 7 is an external rotor motor, the magnetic field of which is directed radially. The inverter 5 is thus located outside the magnetic field and is not interfered with by the latter. The metallic carrier body 1 is also located outside the magnetic field of the electric motor so that no braking eddy currents are created in the carrier body 1. The housing lid 8 in contrast is located in the influence range of the magnetic field and is therefore made of plastic to avoid the creation of eddy currents. Preferably, especially for weight reasons, the housing lid 11 is also manufactured of plastic.

I claim:

1. An outboard drive, with an underwater gondola, comprising an external rotor electric motor arranged in the underwater gondola, and a carrier body with high thermal conductance and an opening through which a shaft extends, wherein the shaft is connected with the electric motor which is electronically controlled from an inverter, and the inverter is in thermal contact with the carrier body, wherein the inverter has a printed circuit board on which electronic switching elements and additional electronic components arranged, with the electronic switching elements being in thermal contact with the carrier body.

2. The outboard drive according to claim 1, wherein the carrier body is made of metal.

3. The outboard drive according to claim 1, wherein the electronic switching elements are transistors.

4. An outboard drive, with an underwater gondola, comprising an external rotor electric motor arranged in the underwater gondola, and a carrier body with high thermal conductance and an opening through which a shaft extends, wherein the shaft is connected with the electric motor which is electronically controlled from an inverter, and the inverter is in thermal contact with the carrier body, wherein the inverter is arranged on a metal plate which is in thermal contact with the carrier body.

* * * * *